United States Patent Office 2,801,190
Patented July 30, 1957

2,801,190

PROCESS FOR RENDERING FIBROUS MATERIALS WATER-REPELLENT

Ludwig Orthner and Martin Reuter, Frankfurt am Main, Germany, assignors to Farbwerke Hoechst Aktiengesellschaft vormals Meister Lucius & Brüning, Frankfurt am Main Höchst, Germany, a company of Germany No Drawing. Application April 7, 1953, Serial No. 347,400

Claims priority, application Germany April 9, 1952

15 Claims. (Cl. 117—135.5)

The present invention relates to a process of rendering fibrous materials water-repellent.

It is known by German Patent No. 569,946 to react aluminum alcoholates with carboxylic acids in various proportions. As far as the compounds still contain alkoxy groups they can be hydrolyzed with water. U. S. Patent No. 2,469,041 also describes the reaction of aluminum alcoholates with higher molecular weight carboxylic acids. As results from the description and the examples of the said U. S. patent, the proportions of the substances have been chosen in such a way so as to obtain neutral aluminum salts of the carboxylic acids. As described, among other things, in U. S. Patent No. 2,469,041, these products can be used for rendering textiles, in organic solvents, water-repellent. However, as has been found, only a small hydrophobic effect is obtained, particularly the effect to repel the water in drop-form is insufficient.

Now we have found that a good hydrophobic effect and an excellent water-repellent effect are obtained by treating fibrous materials, in indifferent organic solvents, with solutions of reaction products from 1 mol of aluminum alcoholate and about 0.2 to 2.5 mols of mono-basic organic substances of an acid nature and capable of forming salts with aluminum, and of higher molecular weight paraffin hydrocarbons and/or natural or synthetic waxes and/or thickly oily to solid higher molecular weight polychlorinated hydrocarbons.

The fibrous material so treated is subsequently dried; the drying process may be carried through at a raised temperature advantageously above 50° C., and suitably in the presence of moisture. It is of advantage to use those reaction products which contain per 1 mol of aluminum alcoholate 0.3 to 1.5 mols, preferably 0.3 to 0.8 mol, of mono-basic organic substances of an acid nature capable of forming salts with aluminum.

Instead of the above-mentioned finished reaction products from aluminum alcoholate and mono-basic organic substances of an acid nature and capable of forming salts with aluminum, mixtures of the above indicated components can be used as well.

The aluminum alcoholates used, are for example, those derived from low or medium aliphatic alcohols. There are mentioned, for instance: aluminum methylate, aluminum ethylate, aluminum propylate, aluminum isopropylate, aluminum butylate, aluminum isobutylate, aluminum amylate, aluminum hexylate, aluminum octylate, aluminum-2-ethyl-butylate, aluminum-2-ethylhexylate, and the like, mixtures of these substances or mixed aluminum-alcoholates.

As an aluminum alcoholate there can furthermore, be used the so-called α-aluminum ethylate. It is readily soluble in organic solvents and can be obtained, as described by Adkins (Journal of the American Chemical Society, vol. 44, page 2178), from amalgamated aluminum by means of absolutely anhydrous ethanol, or, as described by Child and Adkins (Journal of the American Chemical Society, vol. 45, page 3014), by heating sparingly soluble β-aluminum ethylate for 15 hours to 275° C.

Further aluminum alcoholates to be used are those containing per 1 equivalent of aluminum less than 1 equivalent or organic radicals which are bound in an ethereal manner by way of oxygen.

As such radicals there can be used aliphatic, alicyclic, aromatic, araliphatic and heterocyclic hydrocarbon radicals, which may, if required, be substituted by non-acid groups such as the keto or ester group, halogen atoms such as chlorine atoms, or the amino group, or the carbon chain of which may be interrupted by hetero-atoms such as oxygen, sulfur or nitrogen. There may be mentioned, for example: methyl, ethyl, chloroethyl, dimethyl aminoethyl, isopropyl, butyl, octyl, octadecyl, cyclohexyl, phenyl, naphthyl, benzyl, phenylethyl, furfurylmethyl, and the like. Several of the radicals indicated above can be bound simultaneously to the aluminum. Especially suitable aluminum alcoholates are those containing per 1 equivalent of aluminum about 0.5 to 0.9 equivalent of those radicals which are bound in an ethereal way.

The remaining valences of the aluminum, i. e. those which are not bound in an ethereal way, by means of oxygen, to organic radicals can be saturated for example with oxygen under linkage to further aluminum atoms, or with halogen, hydroxyl or organic acid radicals such as acetyl, and in this case several equal or different radicals of those mentioned above can saturate the valences of the radicals of the aluminum at a time.

As aluminum alcoholates which contain per 1 equivalent of aluminum less than 1 equivalent of radicals which are bound in an ethereal way, by means of oxygen, there may be mentioned, for instance, those the solubility of which in organic solvents has been improved by thermal or hydrolytic treatment of normal aluminum alcoholates with splitting off of a part of the alkoxy groups, in most cases probably with linkage of aluminum atoms by way of oxygen atoms.

Among these aluminum alcoholates there may be mentioned, for example, the aluminum ethylates obtained by thermal treatment and corresponding to the empirical molecular formulae $Al_2(OC_2H_5)_4O$ and $Al_4(OC_2H_5)_6O_3$, as described by Henle (Berichte der deutschen chemischen Gesellschaft, vol. 53, page 720); the aluminum ethylate obtained by hydrolytic treatment, as described in German Patents Nos. 277,187 and 277,188, and containing about 2 ethoxyl radicals per atom of aluminum; the basic aluminum ethylate of the empirical molecular formula $Al(OH)(C_2H_5O)_2$ obtained by boiling with anhydrous alcohol with access of air, as described by Meerwein and Bersin ("Annalen" vol 476, page 132); the aluminum-dihydroxocyclohexanolate obtained, as described by Meerwein and Bersin ("Annalen" vol. 476, page 132) by heating aluminum-cyclohexanolate to 275° C.; the basic aluminum ethylate obtained, as described by Bersin (Dissertation Königsberg 1928), by boiling with not absolutely anhydrous ethanol, and containing about 2 ethoxyl groups per atom of aluminum. There may be further mentioned those aluminum alcoholates which can be obtained from aluminum alcoholates by reaction with slightly hydrous alcohols according to the process described by Tischtschenko (Chem. Zentralblatt 1900, I, page 12).

There can be further used those readily soluble aluminum alcoholates which are obtained by the reaction of metallic aluminum and slightly hydrous alcohols, advantageously in the presence of activating agents, and which contain per 1 equivalent of aluminum about 0.5 of 0.8 alkoxy groups. As aluminum alcoholates containing halogen atoms there may be mentioned, for instance: readily soluble aluminum alcoholates containing halogen, corresponding for instance to the formula $AlHal(OR)_2$ or Al₂Hal₃(OR)₃, wherein R stands for lower aliphatic radicals, such as AlCl(OC₂H₅)₂, and obtainable by causing aliphatic alcohols to react upon aluminum chloride, as described by Mpetse (Chemisches Zentralblatt 1931, II, 1691).

Readily soluble aluminum alcoholates of that kind containing halogen can also be obtained, according to the process described in German Patent No. 859,143, by reacting a theoretically insufficient quantity of alcohols with aluminum halides in the presence of ammonia or amines. Furthermore, there may be mentioned: aluminum alcoholates containing halogen or being free from halogen and corresponding to the formula

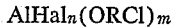

AlHal_n(ORCl)_m

[n+m=3, m being at least 1, R standing for an alkylene radical]. These substances can be obtained by reacting aluminum halides with alkylene oxides, AlCl(OC₂H₄Cl)₂, for instance, can be obtained by reacting 2 mols of ethylene oxide with aluminum chloride.

In halogenated aluminum alcoholates of that kind, part of the radicals bound in an ether-like manner can, furthermore, be split off by thermal or hydrolytic after-treatment; it is probable that in most cases a bridge between the aluminum atoms is also formed by means of oxygen bridges.

Furthermore, there are mentioned aluminum compounds obtainable by thermal and/or hydrolytic treatment of carboxylic acid aluminum dialcoholates. This reaction leads to a partial separation of alkoxyl radicals and, probably, to the formation of chains between the aluminum atoms by means of the oxygen atoms. Thereby carboxylates of complex aluminum alcoholates of the formula AlS_x(OR)_yO_z [S=acyl] in which the sum of x and y and z reaches the value of 2.5–3, for instance Al₁(OC₂H₅)₁(CH₃COO)₁°₀.₅, are for example obtained.

There can also be used mixtures of aluminum alcoholates having a reduced content of alkoxyl or mixtures of these alcoholates with normal aluminum alcoholates containing 3 alkoxyl groups.

Instead of the aluminum alcoholates, the products obtained by addition of carbon dioxide or sulfur dioxide to these alcoholates can also be used for the preparation of the solutions of the aluminum alcoholates. (cp. Tischtschenko, Chemisches Zentralblatt 1900, I, page 585). The said addition products are advantageously used whenever they are more stable in storage than the alcoholates themselves. When dissolving the addition compounds in inert solvents, especially in the heat, carbon dioxide or sulfur dioxide splits off and the alcoholates are recovered.

The aluminum alcoholates can also be used in the form of their alkoxo acids and/or in a form stabilized against moisture by means of volatile organic substances capable of forming complex compounds.

As mono-basic organic substances of an acid nature capable of forming salts with aluminum and suitable for the manufacture of reaction products with aluminum alcoholate, there may be mentioned, for example: mono-carboxylic acids, mono-sulfinic acids, mono-sulfonic acids, mono-sulfuric acid esters, mono-sulfamic acids, mono-basic phosphonic acids, mono-basic phosphoric acid esters, diacylamides containing carboxyl and/or sulfonyl radicals, sulfamides and the like. Instead of mono-carboxylic acids, their anhydrides can be used as well, because they are converted into free acids and indifferent esters with the traces of alcohol which inevitably adhere to the aluminum alcoholates. Instead of mono-basic ester-acids dicarboxylic anhydrides can also be used which form likewise mono-basic esters with the traces of alcohol which are always present.

These compounds can belong to the aliphatic, isocyclic, aromatic or heterocyclic series and can contain further indifferent substituents of neutral nature, for instance halogen atoms, atom groups, such as the groups OH or SH, or ether, thioether or ester groups, carbon amide or urea groups or the like. This chain of carbon atoms can be interrupted by heteroatoms such as O, N, or S.

As aliphatic mono-carboxylic acids may be mentioned, for example: formic acid, acetic acid, propionic acid, butyric acid, caproic acid, caprylic acid, capric acid, stearic acid, oleic acid, palmitic acid, lauric acid, myristic acid, behenic acid, montanic acid, mixtures of fatty acids obtained by oxidation of paraffin, resin acids, such as abietic acid or colophony. Instead of pure acids there can also be used mixtures of the acids mentioned or mixtures of acids which are obtained from natural products, if necessary hydrogenated. Mixtures of this kind are, for instance, the fatty acids of sperm oil, coconut oil, tall oil, linseed oil, soy bean oil, fish oil, cottonseed oil, train oil, peanut oil, sulfocarbon oil, rape oil, tallow animal oil, bone fat, lard, tung oil. There may further be mentioned, for example, acrylic acid or methacrylic acid, crotonic acid, methoxyacetic acid, ethoxyacetic acid, butoxyacetic acid, dodecycloxyacetic acid, chloroacetic acid, α-chloropropionic acid, β-chloropropionic acid, α-chlorobutyric acid, thioglycolic acid, thiolactic acid, malonic acid, mono-ethyl ester, oxalic acid mono ethyl ester, the semi-amide of malonic acid, hydantoic acid, glycolic acid, lactic acid, β-hydroxybutyric acid, the mono-ethyl ester of maleic acid, propylsulfamido acetic acid, dodecylsulfamido acetic acid, and mixtures of aliphatic alkylsulfamido acetic acids.

As alicyclic mono-carboxylic acids can be used, for instance: cyclopentane-carboxylic acid, cyclohexane-carboxylic acid, hexahydro-salicylic acid or analogous acids.

As aromatic mono-carboxylic acids are mentioned, for instance: benzoic acid, ortho-chlorobenzoic acid, 4-chlorobenzoic acid, 2-methyl-benzoic acid, 3-methyl-benzoic acid, 4-methyl-benzoic acid, α-naphtoic acid, β-naphtoic acid, α-naphthoxy acetic acid, β-naphthoxy-acetic acid, phenyl-acetic acid, cinnamic acid, phthalic acid-mono-ethyl ester, salicylic acid, 2.3-hydroxynaphthoic acid, 3-hydroxybenzoic acid, 4-hydroxybenzoic acid, methoxybenzoic acid, phenoxy-acetic acid, 2.4-dichlorophenoxy-acetic acid, the semi-amide of phthalic acid, paratoluene-sulfamido-acetic acid, and the like. As heterocyclic mono-carboxylic acids may be mentioned, for example: pyromucic acid, nicotinic acid, thiophene-α-carboxylic acid, 2-hydroxy-carbazole-3-carboxylic acid, 3-hydroxy-diphenylene-oxide-2-carboxylic acid, 1-phenyl-pyrazolone (5)-3-carboxylic acid, 5-benzoyl-benzoxazolone-2-carboxylic acid, 3-hydroxy-2-methyl-quinoline-4-carboxylic acid, pyrrole-α-carboxylic acid, β-indolyl-acetic acid.

For the reaction with the aluminum alcoholate carboxylic anhydrides can also be used according to the process described in German Patent No. 853,354, such as acetic anhydride, propionic anhydride, lauric anhydride, benzoic anhydride, stearic anhydride, phthalic anhydride, succinic anhydride, maleic anhydride, 4-chlorophthalic anhydride, 3.6-dichlorophthalic anhydride, tetrachlorophthalic anhydride, tetrahydrophthalic anhydride and similar products obtained by the diene-synthesis with maleic anhydride. Furthermore, mono-basic diacylamides of carboxylic acids, such as diacetamide, dilaurilamide, dibenzamide, phthalimide and the like may also be used.

As organic mono-sulfinic acids enter into consideration, for instance: the sulfinic acids of ethane, propane, dodecane, cyclohexane, benzene.

As organic mono-sulfonic acids may be mentioned, for example: propanesulfonic acid, dodecanesulfonic acid, cyclohexanesulfonic acid, benzenesulfonic acid, paratoluene-sulfonic acid, naphthalenesulfonic acid, octylbenzene-sulfonic acid, butylnaphthalene-sulfonic acid, hydroxyethane-sulfonic acid, phenosulfonic acid, naphtholsulfonic acid, 2-hydroxy-carbazole-7-sulfonic acid, thiophene-α-sulfonic acid. There can, furthermore, be used the mono-basic amides and imides of sulfonic acids of the said kind, such as benzene-disulfimide, para-toluene-disulfimide, dodecane-disulfimide, propane-disulfimide.

There can also be applied, for instance, the mono-basic sulfinic and sulfonic acids, the sulfamides and sulfimides from mixtures of hydrocarbons of middle or higher molecular weight which can be obtained, for example, by known processes from the sulfochlorides of fossil and synthetic diesel oils or by sulfonation of petroleum distillates and alkylbenzenes.

As mono-sulfuric esters are mentioned, for instance: ethylsulfuric acid esters, butylsulfuric acid esters, dodecylsulfuric acid esters, cyclohexylsulfuric acid esters, phenylsulfuric acid esters, alkylphenylsulfuric acid esters, stearylsulfuric acid esters, benzylsulfuric acid esters.

As mono-basic organic sulfamic acids may be mentioned for example: ethylsulfamic acid, dodecylsulfamic acid, cyclohexylsulfamic acid, phenylsulfamic acid.

Furthermore, there come into question, for example, mono-basic acid cyclic imides: benzoic acid sulfimide, barbituric acid, ethylbarbituric acid.

As mono-basic organic phosphonic acids can be used, for instance: the mono-esters of phosphonic aliphatic or alicyclic alcohols, such as the mono-ethylester of the cyclohexane-phosphonic acid of the formula $$C_6H_{11}PO(OC_2H_5)OH$$

and the corresponding amyl ester, the ethyl, amyl, dodecyl, or cyclohexyl esters of hexanephosphonic acid, or the ethyl, butyl, dodecyl, or cyclohexyl esters of phenylphosphonic acid.

As mono-basic phosphoric acid esters are used, for example: the dialkyl esters of phosphoric acid of the formula $PO(OR)_2OH$ [R=aliphatic or alicyclic radical] such as the diethyl, dibutyl, diamyl, didodecyl, dibenzyl, dioctadecyl or dicyclohexyl esters of phosphoric acid.

There can also be used mixtures of these compounds; it is also possible to react several compounds one after the other with the aluminum alcoholate, for instance, first acetic acid, then benzoic acid or 2.3-hydroxy-naphthoic acid.

It is of particular value gradually to use the above-mentioned acid organic compounds and higher molecular weight carboxylic acids for the reaction with the aluminum alcoholate, i. e. the latter is first reacted, for instance, with 0.3–1.5 mols of acetic acid and then with 0.2–1.5 mols of stearic acid, the total amount used being at most 2.5 mols.

By the use of the various aluminum alcoholates and organic acids or the derivatives thereof indicated above the properties of the organic aluminum compounds so obtained can be suitably adjusted to the respective use of the impregnated fabric.

The reaction products obtained from the above-mentioned organic substances of an acid nature and capable of forming salts with the aluminum and from the aluminum alcoholates can largely be stabilized against decomposition by moisture by means of volatile organic substances which are capable of forming complex compounds. A good effect is obtained when conducting the process of stabilization at a low temperature. Instead of stabilizing the finished reaction products, already stabilized aluminum alcoholates can be used as starting materials, or the stabilizing volatile organic substances capable of forming complex compounds can be added during the reaction. It is of advantage to add the above-mentioned substances capable of forming complex compounds in an amount of about 0.1–2 mols., depending on the degree of stabilization desired, in a liquid or dissolved form at the usual or at raised temperature.

As volatile organic substances capable of forming complex compounds may be mentioned, for example: those compounds containing a weakly acid group, for instance aliphatic hydroxycarboxylic ester such as tartaric acid diethyl ester, or oximes such as acetone oxime, acetaldehyde oxime; compounds containing a group capable of desmotropic re-arrangement into the acid form, such as acetyl acetone, acetoacetic ester, malonic acid dinitrile, nitromethane, nitropropane and the like; compounds containing a reactive methylene group such as malonic acid esters; hydroxyoxo compounds such as butyroin; aliphatic nitriles such as acetonitrile.

As higher molecular weight paraffin hydrocarbons can be used, for example: the various kinds of solid paraffins, for instance those having a solidification point of 52° C.–54° C., higher molecular weight synthetic paraffin hydrocarbons of a solidification point of about 50° C.–100° C. or the mixtures thereof, and ceresine. Mixtures of solid paraffins with other higher molecular weight paraffin hydrocarbons can also be used, for instance, semisolid paraffin gatsch of a dropping point of about 30° C.–40° C.

As natural or synthetic waxes may be mentioned, for example: carnauba wax, candelilla wax, esters of montanic acids with aliphatic polyhydric alcohols, esters from higher fatty acids and higher fat alcohols. By the use or the concomitant use of waxes the fastness to rubbing of the impregnation is, in general, improved, and the fabric is considerably less susceptible to dirt.

As thickly oily or solid higher molecular weight polychlorinated hydrocarbons can be used, for example: the chlorination products from fossil or synthetic aliphatic hydrocarbon oils, boiling between about 200° C. and 400° C., from fossil or synthetic solid paraffin hydrocarbons, solidifying between about 50° C. and 100° C., from fossil or synthetic, semisolid paraffin gatsches, chlorination products from aromatic hydrocarbons such as naphthalene. The chlorine content of the compounds may vary, according to the mode of application of the finished fabric, within wide limits and can amount up to 80 percent.

When highly chlorinated hydrocarbons are used in the absence of essential quantities of paraffins or waxes, (in this case reaction products of 1 mol of aluminum alcoholate with less than 0.8 mol of the mono-basic organic substances of an acid nature and capable of forming salts with aluminum are advantageously used as further impregnating components), remarkable properties of flame-proof are obtained in addition to the water-repellent properties.

As indifferent organic solvents can be applied, for instance, low-boiling hydrocarbons or chlorinated hydrocarbons such as benzine, benzene, carbon tetrachloride, tri-chloroethylene, perchloroethylene or the mixtures thereof.

The process of the present invention can be applied for rendering water-repellent: vegetable, animal, or synthetic fibrous materials, such as cotton, linen, viscose fibers, cuprammonium rayon, wool, silk, casein fibers, cellulose acetate fibers, polyamide fibers, polyacrylnitrile fibers, poly ester fibers or the mixtures thereof. The fibrous material may be impregnated before or after having been worked up.

When applying diluted solutions very good effects are already obtained. In general, solutions of about 1–10 percent strength are suitably used. In the impregnation of polyamide or poly ester fibers, a good effect is already obtained by using solutions of about 0.1 percent strength only.

The concentration of the solutions depends, of course, largely on the degree to which the impregnating liquid is removed by centrifuging, squeezing and the like before the drying and, if required, the heating process. If the material has been squeezed to a high extent, it is of advantage to proceed with more concentrated solutions, whereas in the case of a small squeezing effect also more diluted solutions can be used. The above indications are, therefore, only general instructions and apply in the first place to a squeezing effects of about 100 percent.

The proportion in which the reaction products of aluminum alcoholate with organic substances of an acid nature on the one hand and the higher molecular weight paraffin hydrocarbons or the natural or synthetic waxes or the polychlorinated hydrocarbons on the other can be used, can vary within wide limits. In general, equal amounts of the compounds concerned can be applied, but there can just as well be used a considerable excess of either the reaction products on the basis of aluminum alcoholate or the paraffin hydrocarbons or the other hydrophobic compounds. The quantity of the one component can amount, for instance, up to 10 times the quantity of the other. In many cases especially good results are obtained when the components are used at a ratio of from 2:1 to 1:2. The solutions can be prepared by dissolving the respective components per se and then mixing the solutions. When the solutions of aluminum alcoholate and mono-basic organic substances of an acid nature and capable of forming salts with aluminum are mixed, the reaction occurs already in the cold and is terminated during the heat treatment usually applied to the fibers. The components can also be dissolved together, or products can be prepared which are dissolved in organic solvents and then used in the above process. The said preparations are obtained by mixing or fusing the paraffin hydrocarbons and the reaction products of aluminum alcoholates with the above-mentioned organic substances of an acid nature. When the fibrous material has been treated, at the usual or at a raised temperature, with the impregnating liquid, the excess of the liquid is removed by blowing off, squeezing off or the like, and the fabric is then dried. When garments are impregnated, the impregnating process is advantageously carried through in the machines usually applied for dry cleaning, and the excess of the impregnating liquid is then drawn off. The impregnated fabric is then centrifuged in the machine, and most of the solvent is distilled off at a raised temperature. The still adhering parts of the solvent are removed by blowing in hot air which, if necessary, may still contain a certain moisture content. In order to improve the water-repellent effect, the dry goods can be subjected in the usual manner to a heat treatment at about 50° C.–200° C., preferably at 100° C.–150° C., for instance, in a drying cabinet and/or by ironing or hot pressing. This further heat treatment is advantageously carried through also in the presence of steam.

The impregnating liquid which has been drawn off or centrifuged off can be used again, if necessary after restrengthening it with the agent imparting water-repellency. For the impregnating process the fabric is, in general, set in in an air-dry condition. In order to attain the air-dry stage, the above-mentioned concomitant use of the substances capable of forming complex compounds which stabilize the fabric against moisture can be of advantage.

Another method of reducing the normal moisture content of the fibrous material before the impregnating process consists in drying it.

The process of this invention can, furthermore, be combined with other finishing processes, preferably with those which are carried through in an organic solvent, for instance with a process for rendering fabric mothproof or with a final finish with thermoplastics soluble in organic solvents, such as polyvinyl acetate or polyacrylic acid esters.

If required, small quantities of further indifferent thickly oily to solid non-hydrophilic organic substances of higher molecular weight and soluble in organic solvents can be added to the impregnating bath, according to the mode of application of the fabric, for instance: caoutchouc, rubber-hydrochloride, synthetic caoutchouc, natural and synthetic resins, such as shellac, phenoplastics, aminoplastics, alkyl resins, the resins of maleic ester, vinyl polymers, for instance polyvinyl chloride, and the like, polyethylenes, polyisobutylenes, natural and synthetic higher molecular weight esters of aliphatic polyalcohols with higher carboxylic acids, higher phthalic acid esters, nitrocellulose and the like.

The process of this invention is particularly suited for impregnating upper garments immediately after the dry cleaning process.

Reference is made to our patent application entitled: "Aluminum compounds and the process of preparing them" filed simultaneously. The following examples serve to illustrate the invention, but they are not intended to limit it thereto, the parts being by weight unless otherwise stated and the relationship of parts by weight to parts by volume being the same as that of the kilogram to the liter.

Example 1

Air-dry poplin cloaks of cotton are impregnated for 5–10 minutes at 60° C., in a scouring machine suitable for dry-cleaning, at a ratio of goods to liquor of 1:10, with a solution containing per litre of carbon tetrachloride 10 grams of the condensation product of aluminum isopropylate and stearic acid (obtained by the reaction of 1 mol of aluminum-isopropylate with 0.65 mol of stearic acid (solidification point 65° C.)) and 10 grams of paraffin (solidification point 52° C.). The liquor is then discharged, the fabric centrifuged and the solvent distilled off at a raised temperature. The fabric is then dried for 15 minutes at 60° C. by means of hot air having a relative content of atmospheric moisture of 30 percent and then finished by ironing. By this treatment an excellent water-repellent effect and good results in the trough test are obtained.

When proceeding in the same manner but using in the preparation of the carboxylic aluminum alcoholate the stearic acid by the corresponding amount of oleic acid, an excellent water-repellent effect is also obtained.

Example 2

Air-dry delustred crepe of regenerated cellulose is passed in a padding machine at 65° C. through a solution containing per litre of carbon tetrachloride 15 grams of the condensation product of aluminum isopropylate and stearic acid (obtained by the reaction of 1 mol of aluminum-isopropylate with 0.8 mol of commercial stearic acid (solidification point 55° C., molecular weight 272)) and 20 grams of paraffin (solidification point 52° C.). The liquor is then squeezed off and the fabric is dried at a raised temperature by means of air. The fabric is then heated for 30 minutes at 80° C., in a drying closet, by means of air having a relative moisture content of about 20 percent. By this treatment an excellent water-repellent effect is obtained.

Heavy fabrics, for example heavy canvas of cotton can very well be impregnated in the same manner; in this case it is of advantage further to add to the impregnating bath $\frac{1}{20}$ part by volume of a solution of 5 percent strength of rubber hydrochloride in carbon tetrachloride or a benzene-caoutchouc solution of 5 percent strength.

When proceeding in the same manner but starting from aluminum-n-propylate, an equally good result is obtained.

Example 3

Air-dry satin of acetate rayon is treated as described in Example 2 at 65° C. with a solution containing per litre of carbon-tetrachloride 12 grams of the condensation product of aluminum ethylate and commercial stearic acid (obtained by reaction of 1 mol of aluminum ethylate with 1.0 mol of commercial stearic acid (solidification point 55° C., molecular weight 272)) and 10 grams of paraffin (solidification point 52° C.). The fabric is then dried with hot air having a relative moisture content of about 30 percent. A very good water-repellent effect is obtained. When proceeding in the same manner but using olein (solidification point +5° C., iodine number: 90, saponification number: 203) instead of stearic acid, a very good water-repellent effect is likewise obtained.

Example 4

Air-dry gabardine cloaks of wool are impregnated for 10 minutes at 55° C. in a scouring machine suitable for dry cleaning with a solution containing per litre of carbon tetrachloride 12 grams of the condensation product of aluminum-isopropylate and stearic acid (obtained by reaction of 1 mol of aluminum-isopropylate with 0.6 gram of stearic acid (solidification point 65° C.)) and 15 grams of ceresin (solidification point 50° C.), the ratio of goods to liquor being 1:10. The liquor is then discharged, the fabric is centrifuged and the solvent is distilled off. The fabric is heated for 15 minutes at 60° C. by means of air having a relative moisture content of about 30 percent and then finished by ironing. An excellent water-repellent effect is obtained.

When proceeding in the same manner but using, instead of stearic acid, the corresponding amount of oleic acid (solidification point 10° C.), an excellent water-repellent effect is also obtained.

Example 5

Air-dry rain wear of polyamide fibers is impregnated and worked up as described in Example 1. An excellent water-repellent effect is obtained.

Example 6

By the method described in Example 1 air-dry rain wear of polyamide fibers is impregnated for 5–10 minutes at 20° C., at a ratio of goods to liquor of 1:10, with a solution containing per litre of carbon tetrachloride 10 grams of the condensation product of aluminum ethylate and commercial oleic acid, 10 grams of lignite distillation, 10 grams of paraffin and 10 grams of ceresin and worked up. An excellent water-repellent effect is obtained. The commercial oleic aluminum ethylate used has been obtained by reacting 11 kilograms of a commercial solution of aluminum ethylate, containing halogen, in ethyl acetate (2.2 percent of aluminum), which has been produced by the process described in German Patent No. 386,688, with 2 kilograms of commercial fatty acid from sperm oil (acid number: 211, saponification number: 214, iodine number: 71) and distilling off the ethyl acetate.

When proceeding in the same manner but using, instead of the fatty acid from sperm oil, 2.5 kilograms of commercial fatty acid from castor oil (acid number: 178, saponification number 197, iodine number: 85; 2.3 percent of OH) or 4 kilograms of commercial stearic acid (solidification point 52° C.) an excellent water-repellent effect is also obtained.

Example 7

By the method described in Example 2 a delustred crepe pre-dried to 2 percent of moisture and made of regenerated cellulose is impregnated at 20° C. in a padding machine with a solution containing per litre of carbon-tetrachloride 40 grams of a benzene solution of 30 percent strength of the condensation product of aluminum-isopropylate and stearic acid (obtained by reaction of 1 mol of aluminum-isopropylate in a benzene solution at 20° C. with 1.8 mols of commercial stearic acid) and 30 grams of paraffin (solidification point 52° C.) and worked up. Very good properties of water-repellency have been imparted to the fabric.

Example 8

By the method described in Example 1 air-dry poplin cloaks of cotton are impregnated for 5–10 minutes at 20° C. at a ratio of goods to liquor of 1:12 with a solution of 100 grams of a pasty agent imparting water-repellency per litre of benzene and then worked up.

An excellent water-repellent effect is obtained by this treatment. The pasty agent has been obtained as follows: 110 kilograms of a solution of commercial aluminum ethylate, containing halogen, in ethyl acetate (2.2 percent of aluminum) which has been prepared according to German Patent No. 386,688, are reacted at 70° C. with 11 kilograms of stearic acid and the ethyl acetate is distilled off. To the fused mass of the condensation product so obtained 60 kilograms of paraffin are added and the whole is intimately mixed. 100 kilograms of perchloroethylene are then added and the mixture is cooled, while stirring, forming a thickly pasty product capable of being poured.

When proceeding in the same manner but using, instead of stearic acid, the corresponding amount of oleic acid, a very good water-repellent effect is also obtained.

Example 9

Light-weight muslin of staple fiber is impregnated with a solution of 3.5 grams of a condensation product of 1 mol of aluminum-isopropylate with 0.8 mol of stearic acid and 7 grams of a paraffin gatsch per liter of carbon tetrachloride. The liquid is squeezed off from the fabric or the fabric is centrifuged until an increase in weight of 160 percent has been reached. The fabric is dried and ironed for a few seconds at various temperatures.

In the rain room test the following data of absorption of water, given in percentages, and of water-repellent effect, given in proportion to the time of rain test, have been obtained:

| Ironing temperature, °C | 20 | 50 | 125 | 160 | 190 | 220 | 250 |
|---|---|---|---|---|---|---|---|
| Percent of absorption of water | 23 | 19 | 8 | 6 | 10 | 17 | 23 |
| Water-repellent effect | 4/6 | 4/6 | 6/6 | 6/6 | 5/6 | 4/6 | 4/6 |

The not ironed fabric not yet made water-repellent absorbs 110 percent of water and shows no properties of water-repellency.

Hence it results that, within a certain range of temperature, the water-repellent effect reaches an optimum whereas inferior results are obtained when proceeding below or above this range. When heating for a prolonged time, the same effect can be obtained, under certain conditions, also at a somewhat lower temperature. Heating can be carried through in the usual manner, for example in the drying closet, tumbler, drying chamber, hanging room, on the felt calender, cylinder, with a flat iron or a steam flat iron.

Example 10

By the method described in Example 2 an air-dry poplin fabric of cotton is impregnated at 50° C. with a solution containing per liter of carbon tetrachloride 20 grams of a solution of 30 percent strength of the condensation product of aluminum-2-ethyl-butanolate and stearic acid (obtained by the reaction of 1 mol of aluminum 2-ethyl-butanolate at 80° C. in a xylene solution with 0.7 mol of commercial stearic acid) and 30 grams of paraffin (solidification point 52° C.) and worked up. By this treatment very good properties of water-repellency are imparted to the fabric. When proceeding in the same manner but starting from aluminum-2-ethyl-hexanolate (1) equally good results are obtained.

Example 11

By the method described in Example 1 air-dry poplin cloaks of cotton are impregnated for 5–10 minutes at 20° C., at a ratio of goods to liquor of 1:12, with a solution of 100 grams of a pasty agent imparting water-repellency obtained as indicated below, per liter of benzine and worked up. An excellent water-repellent effect is obtained. The pasty agent has been obtained as follows: 266 kilograms of an aluminum-chloroethylate obtained from aluminum chloride and 3 mols of ethylene oxide are reacted at 60° C. in a benzene solution with 140 kilograms of stearic acid, and the solvent is distilled off. 500 kilograms of paraffin are added to the fused mass of the condensation product so obtained, intimately mixed at 60° C. and diluted with 1000 kilograms of perchloroethylene. The mixture is liquid in the heat and solidifies on cooling to a pasty product which dissolves in aliphatic hydrocarbons and chlorinated hydrocarbons to give a clear solution.

When proceeding in the same manner but using instead of aluminum-chloroethylate, 411 parts of an aluminum-dichloropropylate, obtained in the same manner from aluminum chloride and 3 mols of epichlorhydrin, or 308 parts of an aluminum-bromopropylate obtained from aluminum bromide and 3 mols of propylene oxide, or reacting, instead of stearic acid, 240 parts of the commercial fatty acid from sperm oil (acid number: 212, saponification number: 214, iodine number: 71) with aluminum chloroethylate, products of very good properties of water-repellency are likewise obtained.

*Example 12*

A poplin fabric of regenerated cellulose is impregnated for 5 minutes at about 50° C. in a standing bath, at a ratio of goods to liquor of 1:15, with a solution of paraffin and the condensation product of aluminum methylate and stearic acid in perchloroethylene. The impregnating bath is obtained as follows:

12 parts of aluminum methylate are boiled, while stirring, for 1 hour under reflux with 25 parts of stearic acid and 300 parts of benzene. The syrupy solution of the condensation product so obtained is then diluted with 4000 parts of perchloroethylene in which 40 parts of paraffin have previously been dissolved. When the impregnating process has been terminated, the liquor is squeezed off from the fabric until an increase in weight of about 100 percent has been reached, the fabric is then hanged in the open air for drying and then heated at about 100° C. with dry air in a warming cabinet. By this treatment very good properties of water-repellency are imparted to the fabric.

When proceeding in the same manner but using in the preparation of the impregnating bath, instead of stearic acid, the corresponding amount of oleic acid or abietic acid or colophony or 33 parts of montanic acid (molecular weight 372), very good properties of water-repellency are likewise obtained.

*Example 13*

A poplin fabric of polyester fibers (obtained from terephthalic acid and glycol) is passed at 20° C., in a padding machine, through a solution containing per liter of carbon tetrachloride 15 grams of the condensation product of aluminum-isopropylate and commercial stearic acid (obtained by the reaction of 1 mol of aluminum-isopropylate with 1.5 mols of commercial stearic acid (solidification point 55° C., molecular weight 272)), a mixture of equal portions of xylene and isopropanol being used as solvent, and 20 grams of paraffin (solidification point 52° C.). The liquid is then squeezed off and the fabric is dried with air at a raised temperature. The fabric is then heated for 30 minutes at 80° C. in a drying cabinet by means of air having a relative moisture content of about 10 percent. By this treatment a very good water-repellent effect is obtained. When treated in the same manner, a poplin fabric of polyacrylnitrile fibers shows also very good water-repellent properties.

When proceeding in the same manner but using, instead of stearic acid, the corresponding amount of a fatty acid from sperm oil or fatty acids obtained by oxidation (average molecular weight about 200), an excellent water-repellent effect is likewise obtained.

*Example 14*

Felt hats are treated at room temperature with a solution containing per liter of perchloroethylene 30 grams of the condensation product of aluminum-isopropylate and commercial stearic acid obtained by the reaction of 1 mol of aluminum isopropylate with 0.8 mol of commercial stearic acid (solidification point 55° C., molecular weight 272) and 40 grams of paraffin, then dried and steamed. The hats so treated show good impregnating and water-repellent properties and a smooth feel. If required, the impregnating bath may contain an addition of a stiffening finishing agent, for example 10 grams of shellac or 10 grams of soluble polyvinylacetate per liter of perchloroethylene.

*Example 15*

A viscose rayon ball is soaked with a solution containing per liter of carbon tetrachloride 80 grams of the condensation product of aluminum-isopropylate and stearic acid (obtained by the reaction of 1 mol of aluminum-isopropylate with 0.65 mol of stearic acid (solidification point 65° C.)) and 80 grams of paraffin (solidification point 52° C.) and squeezed off to an increase in weight of 20 percent, dried and heated for 1 hour to 120° C. When being woven, an umbrella silk of excellent properties of water-repellency is obtained.

*Example 16*

Air-dry poplin cloaks of cotton are impregnated for 5–10 minutes at 50° C., at a ratio of goods to liquor of 1:10, with a solution obtained as follows:

1.4 kilograms of aluminum ethylate, dissolved in 12 kilograms of xylene, are diluted with 100 liters of benzine. In the mixture so obtained 1.6 kilograms of lignite distillation of gatsch, 1.6 kilograms of ceresin and 2 kilograms of stearic acid (solidification point 55° C.) are dissolved. After the impregnating process has been terminated the liquor is discharged, the fabric is centrifuged and the solvent is distilled off at a raised temperature. The fabric is then dried for 15 minutes at 60° C. by means of hot air having a relative moisture content of 30 percent and then finished by ironing. An excellent water-repellent effect and also very good results in the trough test are thus obtained.

When proceeding in the same manner but replacing in the preparation of the impregnating bath the stearic acid by 4.0 kilograms of oleic acid or 1.5 kilograms of lauric acid an excellent water-repellent effect is also obtained.

When proceeding in the same manner but replacing in the preparation of the impregnating bath the aluminum ethylate by 2.1 kilograms of aluminum isobutylate, an excellent water-repellent effect is also obtained.

Instead of poplin cloaks of cotton, air-dry waterproof clothings made of polyamide fibers can be impregnated and finished in the same manner.

*Example 17*

Air-dry gabardine cloaks of wool are impregnated for 5–10 minutes at 20° C., at a ratio of goods to liquor of 1:10, with a solution obtained as follows:

7 kilograms of a solution of commercial aluminum ethylate, containing halogen, in ethylacetate (content of aluminum=2.2 percent) obtained by the process described in German Patent No. 386,688 are diluted with 100 liters of carbon tetrachloride; 2 kilograms of paraffin (solidification point 52/54° C.), 2 kilograms of ceresin and 1.5 kilograms of stearic acid (solidification point 55° C.) are dissolved in the solution. When the impregnating process has been finished, the fabric is further treated as described in Example 16. An excellent water-repellent effect is thus obtained.

When proceeding in the same manner but replacing in the preparation of the impregnating bath the stearic acid by 2.0 kilograms of the fatty acid from castor oil (acid number: 178, saponification number: 197, iodine number: 85; 2.3 percent of OH) or by 1.5 kilograms of colophony, an excellent water-repelling effect is also obtained.

*Example 18*

Delustred crepe of regenerated cellulose is pre-dried to a moisture content of 2 percent and passed at 65° C., in a padding machine, through a solution obtained as described in Example 17. When the impregnating process has been terminated, the liquor is squeezed off from the fabric, and the latter is dried by means of a current of air at a raised temperature. The fabric is then heated for 30 minutes at 80° C., in a drying closet, with air having a relative content of moisture of about 20 percent. By this treatment a very good water-repellent effect is obtained. When satin of acetate rayon yarn is treated in the same manner, an excellent water-repellent effect is also obtained.

*Example 19*

Air-dry poplin cloaks of cotton are impregnated, at 50° C., for 5–10 minutes at a ratio of goods to liquor of 1:10 with a solution obtained as follows: 1 kilogram of the addition compound of aluminum ethylate and carbon dioxide is dissolved, while heating, in 20 kilograms of xylene. The solution of 1 kilogram of stearic acid (solidification point 55° C., molecular weight 270) and 2 kilograms of paraffin (solidification point 52° C.–54° C.) in 10 kilograms of hot xylene are then admixed, and the mixture obtained is diluted with 100 kilograms of carbon tetrachloride.

When the impregnating process has been terminated, the fabric is centrifuged, and the solvent is distilled off at a raised temperature. The fabric is then dried for 15 minutes at 60° C. by means of hot air, having a relative moisture content of 30 percent, and subsequently finished by ironing. An excellent water-repellent effect and also very good results in the trough test are thus obtained.

When proceeding in the same manner but using, instead of the addition compound of aluminum ethylate and carbon dioxide, the addition compound of aluminum ethylate and sulfur dioxide, an excellent water-repellent effect is also obtained.

*Example 20*

Air-dry poplin cloaks of cotton are impregnated, at 50° C., for 5–10 minutes at a ratio of goods to liquor of 1:10 with a solution obtained as follows:

In 170 liters of carbon tetrachloride there are dissolved 2 kilograms of the condensation product of aluminum ethylate and stearic acid, obtained from 1 mol of industrial aluminum ethylate by the process described in German Patent No. 386,688, and 0.9 mol of stearic acid (solidification point 55° C., molecular weight 270), 4 kilograms of paraffin and 1 kilogram of a synthetic wax (obtained by esterifying montanic acid with ethylene glycol).

When the impregnating process has been terminated, the fabric is centrifuged and the solvent is distilled off at a raised temperature. The fabric is then dried for 15 minutes at 60° C. by means of hot air, having a relative moisture content of 30 percent, and subsequently finished by ironing. A very good water-repellent effect is thus obtained. Furthermore, the material thus treated is less readily soiled than a fabric impregnated without an addition of wax.

*Example 21*

Air-dry gabardine cloaks of wool are impregnated for 10 minutes at 40° C., in a scouring machine suitable for dry-cleaning, at a ratio of goods to liquor of 1:10, in a solution containing per liter of carbon tetrachloride 12 grams of the condensation product of aluminum-isopropylate and stearic acid (obtained by the reaction of 1 mol of aluminum-isopropylate with 0.4 mol of stearic acid), 5 grams of paraffin (solidification point 55° C.) and 30 grams of a chlorinated paraffin (obtained by the chlorination of paraffin of a solidification point of 52/54° C. until a content of chlorine up to 58 percent has been reached). The liquor is then discharged, the fabric is centrifuged and the solvent is distilled off. The fabric is heated for 30 minutes to 90° C. by means of hot air having a relative moisture content of about 30 percent and then finished by ironing. The fabric so treated shows an excellent water-repellent effect and is considerably flameproof.

*Example 22*

An air-dry poplin fabric of cotton is impregnated for 5 minutes, at about 50° C., in a standing bath at a ratio of goods to liquor of 1:15, with a solution of acetic aluminum-isopropylate and paraffin in perchloroethylene, which has been obtained as follows:

20 parts of aluminum-isopropylate are dissolved in a mixture of 80 parts of isopropanol and 80 parts of xylene. 5 parts of glacial acetic acid, dissolved in 50 parts of xylene, are added drop by drop, while stirring at about 30° C. and the clear solution obtained of the acetic aluminum-isopropylate is stirred at 80° C. for a further 1 hour. The sprupy solution is diluted with 4000 parts of perchloroethylene, in which 40 parts of paraffin (solidification point 54° C.) have previously been dissolved.

When the impregnation process has been terminated, the impregnating solution is squeezed off from the fabric by a wringing machine to such a degree that the fabric shows an increase in weight of 120 percent. The fabric is then dried at the usual temperature in the open air and then heated for ½ hour at about 120° C. in a warming cabinet. Thus a good water-repellent impregnation is obtained.

When proceeding in the same manner but using 10 parts of chloroacetic acid, instead of glacial acetic acid, for the preparation of the impregnating solution, a good water-repellent impregnation is likewise obtained.

*Example 23*

A muslin fabric of regenerated cellulose is impregnated for 5 minutes, at about 40° C., in a standing bath at a ratio of goods to liquid of 1:15, with a solution of paraffin and the condensation product of acetic aluminum-isopropylate and commercial stearic acid in carbon tetrachloride, which has been obtained as follows:

20 parts of aluminum-isopropylate are dissolved in 80 parts of xylene, and a solution of 6 parts of glacial acetic acid in 60 parts of xylene is added drop by drop, while stirring, at about 30° C. In the solution of acetic aluminum-isopropylate thus obtained 12 parts of commercial stearic acid (molecular weight 270, solidification point 52° C.) are dissolved, while stirring, at about 70° C. The syrupy solution is diluted with 4000 parts of carbon tetrachloride, in which 40 parts of paraffin (solidification point 54° C.) have previously been dissolved. After impregnation the fabric is worked up as described in Example 1. It shows excellent properties of water-repellency.

When proceeding in the same manner as described above but using, instead of stearic acid, the corresponding or half the corresponding amount of the fatty acid from sperm oil, or, instead of paraffin, a mixture of equal parts of paraffin and paraffin-gatsch, or instead of glacial acetic acid, 9 parts of chloroacetic acid or 9 jarts of thioglycolic acid, an excellent water-repellent effect is likewise obtained.

*Example 24*

Upper garments made of polyamide fibers are impregnated for 15 minutes, at about 20° C., in a scouring machine generally used in dry cleaning, at a ratio of goods to liquor of about 1:20, with a solution of paraffin and the condensation product of acetic aluminum ethylate and stearic acid in carbon tetrachloride or test benzine, which has been obtained as follows:

At a temperature of about 20° C. 13 parts of glacial acetic acid are added drop by drop, while stirring, to 100 parts of a solution of commercial aluminum ethylate in ethyl acetate (2.7 percent of Al) which has been obtained by the process described in German Patent No. 386,688. In the resulting solution of acetic aluminum ethylate 11 parts of commercial stearic acid (molecular weight 275, solidification point 52° C.) are dissolved, while stirring, at about 70° C. The solution of the condensation product obtained is diluted with 4000 parts of carbon tetrachloride of 2000 parts of test benzine, in which 30 parts of paraffin (solidification point 52° C.) have previously been dissolved. After impregnation the fabric is centrifuged in the same machine until an increase in weight of about 50 percent has been reached, dried with hot air of about 70° C. and, if necessary ironed. Excellent properties of water-repellency are thus obtained.

When using, instead of stearic acid, 8 or 12 parts of lauric acid or, instead of glacial acetic acid, 2 parts of formic acid and then proceeding as described above (when operating with formic acid, the stearic acid is to be dissolved at the boil) or adding to the paraffin 10 parts of a synthetic wax (obtained by esterifying montanic acid with ethylene glycol) an excellent water-repellent effect is likewise obtained.

Example 25

A gabardine fabric made of wool is impregnated in a padding machine at about 20° C. with a solution of paraffin, chlorinated paraffin, and the condensation product of acetic aluminum ethylate and palmitic acid, in perchloroethylene, which has been obtained as follows:

To a solution of commercial aluminum ethylate in ethyl acetic (2.7 percent of Al), there are added drop by drop, while stirring, 4 parts of acetic anhydride at a temperature of 30° C., and 11 parts of palmitic acid (molecular weight 260) are then dissolved at about 50° C. The clear solution of the condensation product obtained is boiled for 1 hour under reflux and diluted with 2000 parts of perchloroethylene, in which 10 parts of paraffin and 40 parts of chlorinated paraffin (content of chlorine =40 percent) have previously been dissolved. When the fabric has passed the impregnating bath, the liquid is squeezed off by pressing until an increase in weight of 80 percent has been reached, and the material is then dried at 90° C. by means of hot air having a relative content of moisture of about 30 percent.

The gabardine fabric so treated shows excellent properties of water-repellency. In trough-test it also shows very good results and is sparingly combustible.

When proceeding in the same manner but using, instead of acetic anhydride, 5 parts of propionic anhydride, or, instead of palmitic acid, the corresponding or twice the corresponding amount of stearic acid or commercial fatty acid from sperm oil (acid number: 210, saponification number: 214, iodine number, 71) an excellent water-repellent effect is likewise obtained.

Example 26

By the method described in Example 24 upper garments made of poplin of cotton are impregnated in the solution of the condensation product of aluminum butylate and benzoic acid and paraffin in xylene and worked up. The impregating bath is obtained as follows:

25 parts of aluminum-n-butylate are dissolved in 70 parts of benzene, 6 parts of benzoic acid are then dissolved therein, while stirring, at about 40° C., and the solution is heated for one hour at 70° C. The solution is diluted with 2500 parts of xylene, in which 40 parts of paraffin have previously been dissolved. By this treatment very good properties of water-repellency are obtained.

When proceeding in the same manner but using, instead of benzoic acid, 7 parts of 4-chlorobenzoic acid or 8 parts of α-naphthoic acid, good properties of water-repellency are also obtained.

Example 27

By the method described in Example 23 a muslin fabric of regenerated cellulose is impregnated with a solution of the condensation product of aluminum-isopropylate and dibenzene sulfimide and paraffin in carbon tetrachloride and then worked up. The impregnating bath is obtained as follows:

20 parts of aluminum-isopropylate are dissolved at the boil in 200 parts of isopropanol. The solution so obtained is cooled to about 40° C. and 24 parts of dibenzene-sulfimide are dissolved therein, while stirring. The solution is boiled for one hour under reflux and diluted with 4000 parts of carbon tetrachloride, in which 40 parts of paraffin have previously been dissolved. By this treatment good properties of water-repellency are imparted to the fabric.

When proceeding in the same manner but using, instead of dibenzene-sulfimide, 26 parts of di-para-toluene-sulfimide, good properties of water-repellency are also obtained.

Example 28

By the method described in Example 25 a poplin fabric of cotton is impregnated with a solution of salicylic aluminum ethylate and lignite distillation gatsch in carbon tetrachloride and worked up. The solution is obtained as follows: 12 parts of salicylic acid are dissolved, while stirring, at about 80° C. in 100 parts of a solution of commercial aluminum ethylate in ethyl acetate (2.7 percent of Al), diluted with 100 parts of anhydrous alcohol. After boiling for 1 hour under reflux, the solution is diluted with 4000 parts of carbon tetrachloride, in which 40 parts of lignite distillation gatsch have perviously been dissolved. The impregnating bath can also be prepared by mixing the solution of lignite distillation gatsch in carbon tetrachloride with the solution of alumnium ethylate and a solution of the salicylic acid in alcohol.

By this treatment excellent properties of water-repellency are imparted to the fabric.

When proceeding in the same manner but using, instead of salicylic acid, 19 parts of 2.3-hydroxy-naphthoic acid or 17 parts of α-naphthoic acid or 16 parts of ortho-chlorobenzoic acid or 18 parts of benzoic acid, excellent properties of water-repellency are also obtained.

Example 29

By the method described in Example 22 a gabardine fabric made of wool is impregnated in a solution of para-toluene-sulfonic aluminum-ethylate and paraffin in carbon tetrachloride and worked up. The impregnating bath is obtained as follows: 100 parts of the solution of aluminum ethylate applied in the process of Example 24 are boiled for 1 hour under reflux with 8 parts of para-toluene-sulfonic acid dissolved in 80 parts of anhydrous alcohol. The clear solution of the para-toluene sulfonic-aluminum ethylate so obtained is diluted with 4000 parts of carbon tetra-chloride, in which 40 parts of paraffin have previously been dissolved. Good properties of water-repellency are obtained by this treatment.

When proceeding in the same manner but using, instead of para-toluene-sulfonic acid, 7 parts of benzene sulfonic acid or 16 parts of alkyl-sulfonic acid of an average molecular weight of about 300, obtained in known manner from a hydrocarbon fraction (produced by hydrogenation of carbon monoxide according to the Fischer-Tropsch method and having a boiling range of 230° C.–320° C., an average molecular weight of about 220, and an average chain length of about $C_{16}$) by semi-sulfochlorination, hydrolysis to the sulfonic acid and separation of the unsaponifiable matter, good properties of water-repellency are likewise obtained.

Example 30

By the method described in Example 24 upper garments of poplin of regenerated cellulose are impregnated with a solution of the condensation product of aluminum ethylate and the mono-(2-ethylbutyl) ester of the cyclohexane phosphonic acid and paraffin in carbon tetrachloide and worked up. The impregnating bath is obtained as follows:

A solution of 12 parts of the mono-2-ethylbutyl ester of the cyclohexane-phosphonic acid of the formula $$C_6H_{11}PO(OC_6H_{13})OH$$

in 50 parts of ethyl acetate is added at about 20° C.–30° C. to 100 parts of the solution of aluminum ethylate used in the process of Example 24. The clear mixture is boiled for 1 hour under reflux and diluted with 4000 parts of carbon tetrachloride, in which 40 parts of paraffin have previously been dissolved. By this treatment very good properties of water-repellency are obtained.

When proceeding in the same manner but using, instead of the mono-2-ethylbutyl ester, 9.5 parts of ethyl ester or 12 parts of amyl ester or 16 parts of dodecyl ester of the cyclohexane phosphonic acid or the corresponding amounts of the same esters of the phenylphosphonic acid or the hexanephosphonic acid, very good properties of water-repellency are likewise obtained.

Example 31

By the method described in Example 24 upper garments made of poplin of regenerated cellulose are impregnated in a solution of the condensation product of aluminum isopropylate and the dibutyl ester of phosphoric acid and paraffin in carbon tetrachloride and worked up. The impregnating bath is obtained as follows: 20 parts of aluminum isopropylate are dissolved in 100 parts of xylene and there is added the solution of 10 parts of the di-n-butyl-ester of phosphoric acid of the formula $PO(OC_4H_9)_2OH$ in 50 parts of xylene. The clear mixture is then heated for 1 hour to about 70° C. and diluted with 4000 parts of carbon tetrachloride, in which 40 parts of paraffin have previously been dissolved. There are obtained good properties of water-repellency.

When proceeding in the same manner but using, instead of the dibutyl ester 8 parts of diethyl ester or 12 parts of diamyl ester or 22 parts of di-dodecyl ester or 30 parts of di-octadecyl ester or 14 parts of dibenzyl ester of the phosphoric acid of the general formula $$PO(OR)_2OH$$

wherein R stands for one of the radicals mentioned above, good properties of water-repellency are also obtained.

Example 32

By the method described in Example 22 a muslin fabric of cotton is impregnated with a solution of the lactate of aluminum ethylate and paraffin in carbon tetrachloride and worked up. The impregnating bath is obtained as follows:

A solution of 7 parts of anhydrous lactic acid in 60 parts of anhydrous alcohol is added at about 30° C. to 100 parts of a solution of commercial aluminum ethylate in ethyl acetate (2.7 percent of Al). The mixture is heated for 1 hour to 70° C. and diluted with 4000 parts of carbon tetrachloride, in which 40 parts of paraffin have previously been dissolved. Good properties of water-repellency are thus obtained.

When proceeding in the same manner but using, instead of 7 parts of lactic acid, 5 parts of anhydrous gylcolic acid or a mixture of parts of lactic acid and 11 parts of stearic acid, good properties of water-repellency are likewise obtained.

Example 33

By the method described in Example 24 upper garments made of a poplin fabric of cotton are impregnated with a solution of the condensation product of benzenesulfinic acid and aluminum ethylate and paraffin and worked up. The impregnating bath is obtained as follows: 11 parts of a recently prepared benzenesulfinic acid are dissolved, while stirring, at about 50° C., in a solution of 25 parts of aluminum-n-butylate in 100 parts of xylene and diluted with 4000 parts of carbon tetrachloride, in which 40 parts of paraffin and 20 parts of paraffin-gatsch have previously been dissolved. There are obtained good properties of water-repellency.

When proceeding in the same manner but using, instead of benzenesulfinic acid, 20 parts of cyclohexane-sulfinic acid or 8 parts of para-toluene-sulfinic acid or 36 parts of alkyl-sulfinic acid of an average molecular weight of 280, obtained in known manner from a hydrocarbon fraction (produced by hydrogenation of carbon monoxide by the Fischer-Tropsch method and having a boiling range of 230° C.–320° C., an average molecular weight of about 230, and an average chain length of about $C_{16}$) by semisulfochlorination, reaction with sodium sulfite, and separation of the unsaponifiable matter, good properties of water-repellency are likewise obtained.

Example 34

Upper garments made of poplin of cotton are impregnated as described in Example 24 with a solution of paraffin and the condensation product of aluminum butylate and the monobutyl ester of phthalic acid in percholorethylene. The impregnating bath is obtained as follows: 25 parts of aluminum butylate and 12 parts of phthalic anhydride are dissolved at about 60° C. in 100 parts of n-butanol. The solution is heated for 1 hour at about 80° C. and diluted with 4000 parts of perchloroethylene, in which 40 parts of paraffin gatsch have previously been dissolved. After being worked up, the fabric shows good properties of water-repellency.

When proceeding in the same manner but using, instead of phthalic anhydride, 15 parts of 4-chloro-phthalic anhydride, or instead of aluminum butylate and butanol, 100 parts of the solution of aluminum ethylate in ethyl acetate, described in Example 24, while adding 100 parts of anhydrous alcohol, good properties of water-repellency are also obtained.

Example 35

By the method described in Example 22 a poplin fabric of cotton is impregnated with a solution of the condensation product of benzoic acid and aluminum ethylate and paraffin in carbon tetrachloride and worked up. The impregnating bath is obtained as follows: 100 parts of a solution of commercial aluminum ethylate in ethyl acetate (2.7 percent of Al) are boiled with 20 parts of benzoic anhydride, whereby the benzoic acid ethylester is split off and a clear solution of the condensation product of benzoic acid and aluminum ethylate is formed. The solvent is distilled off, the residue is fused at about 80° C. with 40 parts of paraffin (solidification point 52° C.), and the benzoic acid ethyl ester is distilled off under reduced pressure (1 millimeter of mercury). The mixture of paraffin and the condensation product of benzoic acid and aluminum ethylate remaining behind is then dissolved in 4000 parts of carbon tetrachloride. Good properties of water-repellency are obtained.

When proceeding in the same manner, but using, instead of benzoic anhydride, 45 parts of stearic anhydride, good properties of water-repellency are also obtained.

Example 36

By the method described in Example 22 a poplin fabric of cotton is impregnated with a solution of paraffin and the condensation product of acetic aluminum methylate and stearic acid in perchloroethylene and worked up. The impregnating bath is obtained as follows: 12 parts of aluminum methylate are boiled, while stirring, for 1 hour under reflux with 300 parts of benzene and 6 parts of glacial acetic acid; 16 parts of stearic acid are added and the whole is boiled, while stirring, under reflux for another hour. The syrupy solution of the condensation product is diluted with 100 parts of xylene and 4000 parts of perchloroethylene, in which 40 parts of paraffin have previously been dissolved. Very good properties of water-repellency are obtained.

When proceeding in the same manner but using, instead of stearic acid, the corresponding amount of oleic acid, abietic acid, colophony or montanic acid (molecular weight 335) very good properties of water-repellency are likewise obtained.

Example 37

By the method described in Example 22 a poplin fabric of cotton is impregnated with a solution of phthalimide aluminum ethylate and paraffin in carbon tetrachloride and worked up. The impregnating bath is obtained as follows: 6 parts of phthalimide are added, while stirring, to 100 parts of a solution of commercial aluminum ethylate in ethyl acetate (2.7 percent of Al). The mixture is boiled for 1 hour under reflux and the resulting clear solution of the phthalimide aluminum ethylate is diluted with 100 parts of anhydrous alcohol and 4000 parts of carbon tetrachloride, in which 40 parts of paraffin have previously been dissolved. Good properties of water-repellency are thus obtained.

When proceeding in the same manner but using, instead of phthalimide, 4 parts of succinimide or 10 parts of pyromucic acid, good properties of water-repellency are also obtained.

Example 38

Air-dry poplin cloaks of cotton are impregnated for 5–10 minutes, at 60° C., at a ratio of goods to liquor of 1:10, in a scouring machine suitable for dry cleaning, with a solution containing per liter of carbon tetrachloride 10 grams of paraffin (solidification point 52° C.) and 10 grams of the condensation product of aluminum-isopropylate and stearic acid, which has been obtained by reacting 1 mol of aluminum-isopropylate with 0.65 mol of stearic acid (solidification point 65° C.) and has been stabilized against decomposition by atmospheric moisture by adding 0.3 mol of acetoacetic ester and heating it for ½ hour to 60° C. The liquid is then drawn off, the fabric is centrifuged, and the solvent is distilled off at a raised temperature.

The fabric is dried for 15 minutes at 60° C. with hot air having a relative moisture content of 30 percent and then finished by ironing. By this treatment an excellent water-repellent effect and very good results in the trough test are obtained.

When proceeding in the same manner but using instead of stearic acid, the corresponding amount of oleic acid for the preparation of the carboxylic aluminum alcoholate, an excellent water-repellent effect is likewise obtained.

By the same method air-dry rain wear of wool or polyamide fibers can likewise be impregnated and worked up, an excellent water-repelling effect being obtained.

Example 39

An air-dry delustred crepe of regenerated cellulose is passed, in a padding machine, at 65° C., through a solution containing per liter of carbon tetrachloride 20 grams of paraffin (solidification point 52° C.) and 15 grams of the condensation product of aluminum-isopropylate and commercial stearic acid which has been obtained by reacting 1 mol of aluminum isopropylate with 0.8 mol of commercial stearic acid (solidification point 55° C., molecular weight 272) and has been stabilized against decomposition by atmospheric moisture by adding 0.5 mol of acetoacetic ester and heating it for a short time to 50° C. The impregnating liquid is then squeezed off, and the fabric is dried with air at a raised temperature. The material is then heated for 30 minutes, in a drying cabinet, at 80° C. with air having a relative moisture content of about 20 percent. A very good water-repellent effect is thus obtained.

When proceeding in the same manner but using aluminum-n-propylate or aluminum-2-ethyl-butanolate as a starting material, or doubling the amount of the stearic acid, a good water-repellent effect is likewise obtained.

Example 40

10 parts of acetylacetone are added to a solution of 100 parts of the condensation product of aluminum ethylate and mono-stearic acid (obtained by reacting 1 mol of stearic acid with 1 mol of aluminum ethylate), in 2000 parts of carbon tetrachloride.

The effect of the stabilization is perceptible from the behaviour of the solution when aqueous alcohol is added. Whereas a nonstabilized solution remains clear when absolute alcohol is added, basic aluminum stearate is separated when alcohol of 96 percent strength or more hydrous alcohol is added. Under the same conditions, however, no basic aluminum stearate is separated from the stabilized solution.

The solution of carbon tetrachloride obtained is further diluted with 6000 parts of carbon tetrachloride, in which 80 grams of paraffin (solidification point 52° C.) have previously been dissolved, and used for impregnating satin of acetate rayon, at 65° C., by the process described in Example 40. The fabric is then dried with hot air having a relative moisture content of 30 percent. A very good water-repellent effect is thus obtained.

When proceeding in the same manner but using, instead of stearic acid, olein (solidification point=+5° C., iodine number: 90, acid number: 203) or fatty acids from hydrogenated whale oil (acid number: about 200, solidification point 40° C.), a very good water-repellent effect is likewise obtained.

Example 41

By the method described in Example 39 air-dry poplin cloaks of cotton are impregnated for 5–10 minutes, at 20° C., at a ratio of goods to liquor of 1:12 with a solution containing per liter of benzine 100 grams of the below-mentioned pasty agent imparting properties of water-repellency; the material is then worked up. An excellent water-repellent effect is obtained.

110 kilograms of a solution of aluminum ethylate in ethyl acetate (2.2 percent of aluminum), containing halogen and obtained according to German Patent No. 386,688, are reacted, at about 50° C., with 11 kilograms of stearic acid, and about half of the ethyl acetate is distilled off under partial pressure. 40 kilograms of paraffin, 10 kilograms each of lignite distillation gatsch (dropping point 40° C.) and ceresin are added to the residue, the whole is intimately mixed at 60° C., and the remaining ethyl acetate is distilled off, at about 70° C. under partial pressure. 100 kilograms of perchloroethylene are then added, and the solution is stabilized by stirring it for 1 hour, at 60° C., with 4 kilograms of aceto-acetic ester. The mixture is then cooled, while stirring, whereby a substance of thickly pasty consistency capable of being poured is obtained.

When proceeding in the same manner but using, instead of stearic acid, the corresponding amount of oleic acid or commercial fatty acid from sperm oil (acid number: 211, saponification number: 214, iodine number: 71) or fatty acid from castor oil (acid number: 178, saponification number: 197, iodine number: 85; 2.3 percent of OH), a very good water-repellent effect is likewise obtained.

The fabric can be stabilized against moisture under the same conditions but using, instead of acetoacetic ester, a corresponding amount of acetonitrile or nitromethane.

Example 42

Air-dry poplin cloaks of cotton are impregnated for 15 minutes, at about 20° C., in a scouring machine generally used in dry cleaning, at a ratio of goods to liquor of about 1:20, with a solution, stabilized against decomposition by moisture, of the condensation product of aluminum ethylate and stearic acid and paraffin and gatsch in carbon tetrachloride or test benzine; the impregnating bath has been obtained as follows:

2700 parts of paraffin (solidification point 52° C.–54° C.) and 660 parts of lignite distillation gatsch are molten at 90° C. and mixed with 3600 parts of a xylene solution of 25 percent strength (5 percent of aluminum) of 900 grams of readily soluble aluminum ethylate of the approximate analytic construction $Al_1(C_2H_5O)_{2}$, which has been obtained by reacting ethanol of 95 percent strength with aluminum powder in boiling xylene. Into the clear solution obtained is run in, at about 90° C., a solution of 900 parts of stearic acid (solidification point: 54° C., molecular weight: 270) in 3000 parts of perchloroethylene, and the clear solution of the condensation product obtained is heated at 100° C. for 2 hours. In order to stabilize against moisture, 545 parts of acetoacetic ester are then added, while stirring, at 60° C., and the cleat mixture is heated at 60° C. for a further hour. On solidification, a preparation of a lard-like consistency is obtained which is dissolved in 25 times its amount of carbon tetrachloride or test benzine to yield the impregnating liquid. After the impregnating process the fabric is centrifuged in the same machine to an increase in weight of about 75 percent, then dried with hot air at about 70° C. and ironed. Excellent properties of water-repellency are obtained.

When proceeding in the same manner but using, instead of stearic acid, the corresponding amount of colophony or a commercial fatty acid from sperm oil (acid number: 212, saponification number: 214, iodine number: 71) or half the amount of a fatty acid obtained by oxydation (average molecular weight 172), an excellent water-repellent effect is likewise obtained. The acetoacetic ester can just as well be added to the xylene solution of aluminum ethylate, the same result being obtained.

*Example 43*

An air-dry muslin fabric of cotton is impregnated for 1 minute at about 50° C., in a standing bath, at a ratio of goods to liquor of 1:15, with a solution of paraffin and the condensation product of aluminum ethylate and stearic acid in perchloroethylene, which has been obtained as follows: 16 parts of a readily soluble aluminum ethylate, obtained as described by Bersin (Dissertation Königsberg 1928, page 22) and having the analytic construction $Al_1(OC_2H_5)_{2.1}$, are dissolved in 100 parts of anhydrous ethanol, 22 parts of stearic acid (molecular weight: 280, solidification point: 52° C.) and 100 parts of carbon tetrachloride are added, while stirring, at 60° C., and the solution of the condensation product obtained is boiled for 2 hours under reflux. The solution is then diluted with a solution of 40 grams of paraffin in 4000 parts of perchloroethylene.

When the fabric has been impregnated, the liquid is squeezed off in a wringing machine to an increase in weight of about 120 percent, and the fabric is then dried in the open air at about 20° C. The material is then heated for ½ hour, in a warming cabinet, to 100° C. By this treatment good properties of water-repellency are imparted to the fabric.

When proceeding in the same manner but using, instead of stearic acid, a commercial fatty acid from sperm oil or a naphthenic acid (acid number: 230), good properties of water-repellency are likewise obtained.

*Example 44*

A gabardine fabric of wool is impregnated, at about 20° C., in a padding machine with the solution of the condensation product of aluminum butanolate and benzenesulfinic acid, paraffin and chloroparaffin in carbon tetrachloride, which has been obtained as follows: 0.1 mol of a xylene solution of readily soluble aluminum butanolate of the approximate analytic constitution $Al_1(C_4H_9O)_{2.6}$, which has been obtained by reacting 20 parts of aluminum powder with 133 parts of n-butanol (water content: 2 percent) in 260 parts of boiling xylene, is reacted, while stirring, at 50° C. with 0.1 mol of benzenesulfinic acid. The clear solution of the condensation product obtained is heated for 1 hour at 80° C. and then diluted with a solution of 10 parts of paraffin and 20 parts of chloroparaffin (chlorine content: 40 percent) in 2000 parts of perchloroethylene. When the fabric has passed the impregnating bath, the liquid is squeezed off to an increase in weight of about 80 percent and the fabric is then dried at about 90° C. with hot air of a relative moisture content of about 30 percent.

The gabardine fabric so treated shows excellent properties of water-repellency and very good results in the trough test and has become sparingly combustible.

When proceeding in the same manner but using, instead of benzenesulfinic acid, 0.1 mol of cyclohexanesulfinic acid or 0.1 mol of para-toluenesulfinic acid or 0.1 mol of alkylsulfinic acid having an average molecular weight of 280 and obtained in known manner from Fischer-Tropsch hydrocarbons (boiling range: 230° C.–320° C., average molecular weight: about 230, average chain length: about $C_{16}$), by semisulfochlorination, reaction with sodium sulfite and separation of the unsaponifiable matter, very good properties of water-repellency are likewise imparted to the material.

*Example 45*

By the method described in Example 44 an air-dry muslin fabric of regenerated cellulose is impregnated with a solution of benzoic acid, aluminum butanolate and paraffin in carbon tetrachloride and worked up. The solution is obtained as follows: 40 parts of paraffin are dissolved in 4000 parts of carbon tetrachloride, 63 parts of the xylene solution (4.3 percent of aluminum) of readily soluble aluminum butanolate, used in the process described in Example 45, are added, and 11 parts of benzoic acid are then dissolved therein, while stirring.

By this treatment good properties of water-repellency are imparted to the material. When proceeding without the addition of paraffin, only the absorbing capacity of the material is advantageously diminished.

*Example 46*

By the method described in Example 45 a gabardine fabric of wool is impregnated with a solution of paraffin and the condensation product of aluminum chloroethanolate and stearic acid in test benzine and worked up. The impregnating bath has been obtained as follows:

22 parts of aluminum-monochloro-dichloroethanolate of the formula $AlCl(OC_2H_4Cl)_2$ of aluminum chloride and 2 mols of ethylene oxide are dissolved in 40 parts of benzene and the solution is reacted at 80° C. with 28 parts of stearic acid (molecular weight: 280, solidification point: 54° C.). The clear solution of the condensation product, obtained with splitting off hydrogen chloride, is diluted with 2500 parts of test benzine, in which 40 parts of paraffin have previously been dissolved. Excellent properties of water-repellency are imparted to the fabric. When using, instead of stearic acid the corresponding amount of lauric acid, the same result is obtained.

*Example 47*

By the method described in Example 45 a gabardine fabric of cotton is impregnated with a solution of paraffin and the condensation product of aluminum chloroisopropylate and stearic acid in carbon tetrachloride and worked up. The impregnating bath has been obtained as follows: 18 parts of aluminum-monochloro-diisopropylate, obtained by the reaction of 1 mol of acetylchloride with aluminumisopropylate, as described by Tischtschenko ("Chemisches Zentralblatt," 1900, page 585), are dissolved, while stirring, at about 50° C. in 72 parts of xylene, 14 parts of stearic acid (molecular weight: 280, solidification point: 53° C.) and then likewise dissolved therein. The clear solution is stirred for a further hour at 90° C. and diluted with 4000 parts of carbon tetrachloride, in which 40 parts of paraffin have previously been dissolved. By this treatment good properties of water-repellency are imparted to the fabric.

When proceeding in the same manner but using, instead of stearic acid, a corresponding amount of fatty acid from sperm oil or montanic acid, the same result is obtained.

Example 48

By the method described in Example 44 a pre-dried muslin fabric of cotton is impregnated with a solution of gatsch and the condensation product of aluminum ethylate, alkylsulfonic acid and stearic acid in carbon tetrachloride and worked up. The impregnating liquid is obtained as follows: 54 parts of the xylene solution (5 percent of aluminum) of aluminum ethylate, used in the process described in Example 43, are mixed with 40 parts of anhydrous alcohol. In the solution obtained are dissolved, while stirring, at about 30° C., 14 parts of commercial stearic acid (molecular weight: 270, solidification point: 52° C.) and then is added the solution of 15 parts of alkylsulfonic acid (obtained from Fischer-Tropsch hydrocarbons, boiling from 230° C.–320° C. and having the average molecular weight of about 200, by semisulfochlorination, hydrolysis and removal of the oil; molecular weight: about 300) in 40 parts of absolute ethanol. After stirring for 1 hour at 75° C. the clear solution of the condensation product obtained is diluted with the solution of 20 parts of gatsch in 4000 parts of carbon tetrachloride.

Very good properties of water-repellency are obtained. When proceeding in the same manner but using, instead of alkylsulfonic acid, half the amount of para-toluene sulfonic acid or cyclohexanesulfonic acid, very good properties of water-repellency of the material are likewise obtained.

Example 49

By the method described in Example 43 upper garments made of polyamide fibers are impregnated with a solution of ceresin and the condensation product of aluminum ethylate, commercial stearic acid and acetic acid in carbon tetrachloride and worked up. The impregnating liquid is obtained as follows: To 54 parts of the xylene solution (5 percent of aluminum) of aluminum ethylate 5 parts of glacial acetic acid are added dropwise, while stirring, at about 20° C., and 14 parts of commercial stearic acid (molecular weight: 270, solidification point: 52° C.) are then dissolved therein at 50° C. After stirring for 1 hour at 70° C., the solution is diluted with 4000 parts of carbon tetrachloride, in which 20 parts of ceresin have previously been dissolved. By this treatment excellent properties of water-repellency are imparted to the material.

When proceeding in the same manner but using, instead of glacial acetic acid, the corresponding amount of formic or propionic acid or, instead of stearic acid, the corresponding amount of fatty acid from sperm oil, the same result is obtained.

Example 50

By the method described in Example 45 a poplin fabric of cotton is impregnated with a solution of paraffin and the condensation product of aluminum butanolate and phthalic anhydride in carbon tetrachloride and worked up. The impregnating liquid is obtained as follows: 0.1 mol of the xylene solution of readily soluble aluminum butanolate obtained by the process described in Example 45 are mixed with the corresponding volume of butanol. 0.1 mol of phthalic anhydride is added, while stirring, and the mixture obtained is heated to 70° C. After heating for 1 hour to 90° C., the resulting clear solution of the condensation product is diluted with 3000 parts of carbon tetrachloride, in which 50 parts of paraffin have previously been dissolved.

Good properties of water-repellency are thus imparted to the fabric. When using, instead of phthalic anhydride, the corresponding amount of 4-chlorophthalic anhydride, the same result is obtained.

Example 51

Air-dry poplin cloaks of cotton or regenerated cellulose are impregnated for 5–10 minutes, at 20° C., at a ratio of goods to liquor of 1:12, in a scouring machine suited for dry cleaning, with a solution of paraffin and gatsch, and the condensation product of acetic aluminum ethylate and stearic acid in carbon tetrachloride, which has been stabilized against moisture and has been obtained as follows: To 540 parts of a solution of commercial aluminum ethylate in ethyl acetate (2.0 percent of aluminum), obtained according to German Patent No. 386,688, 30 parts of glacial acetic acid are added dropwise, while stirring, at about 20° C., 85 parts of stearic acid are then added and the whole is stirred for 1 hour at 40° C. From the clear solution of the condensation product obtained most of the ethyl acetate is distilled off at 40° C. under reduced pressure. To the remainder 200 parts of paraffin and 50 parts of gatsch are added, while stirring, and the mixture is heated to 60° C. From the clear fused mass the remaining ethyl acetate is then distilled off under reduced pressure, the temperature of the mixture is at last raised to 70° C. 400 parts of perchloroethylene are then added, while stirring, and the solution is stabilized at 60° C. by the addition of 22 parts of aceto-acetic ester. On cooling, the solution solidifies to a lard-like consistency and by adding carbon tetrachloride in 20 times its amount the impregnating bath is prepared. When the fabric has been impregnated, the impregnating liquid is drawn off, the fabric is centrifuged to an increase in weight of about 70 percent, and the solvent is distilled off by means of hot air. The dry cloaks are then finished by ironing. An excellent water-repellent effect and very good results in the trough test are obtained.

When proceeding in the same manner but using in the preparation of the impregnating bath, instead of glacial acetic acid, formic acid, or instead of stearic acid, a commercial fatty acid from sperm oil (acid number: 211, saponification number: 214, iodine number: 71) or instead of aceto-acetic ester, half the amount of acetylacetone, an excellent water-repellent effect is likewise obtained.

By the same method upper garments of wool or polyamide fibers can also be rendered water-repellent.

Example 52

A poplin fabric of regenerated cellulose is impregnated for 5 minutes, at 40° C., in a standing bath, at a ratio of goods to liquor of 1:15, with a stabilized solution of paraffin and the condensation product of aluminum ethylate and benzoic acid in carbon tetrachloride, which has been obtained as follows: To 100 parts of solution of aluminum ethylate in ethyl acetate (2.7 percent of aluminum), obtained by the process described in German Patent No. 386,688, the solution of 12 parts of benzoic acid in 100 parts of anhydrous alcohol is added, while stirring, the mixture is boiled for 1 hour under reflux, 7 parts of acetoacetic ester are stirred in at 60° C., and diluted with the solution of 40 parts of paraffin in 4000 parts of carbon tetrachloride. When the fabric has been impregnated, the impregnating liquid is squeezed off in a wringing machine to an increase in weight of about 100 percent, the fabric is dried in the open air at the usual temperature and then heated for ½ hour at about 120° C. in a warming cabinet. A very good water-repellent effect is thus obtained.

When proceeding in the same manner but using, instead of aluminum ethylate in ethyl acetate, 100 parts of a xylene solution of 20 percent strength of aluminumisopropylate, a good water-repellent effect is likewise obtained.

Example 53

A muslin fabric of cotton is impregnated at about 30° C. in a padding machine with a stabilized solution of paraffin and the condensation product of aluminum-isopropylate and stearic acid in carbon tetrachloride, which has been prepared as follows: 20 parts of aluminum-isopropylate, dissolved in 100 parts of benzene, are stabilized against moisture by adding 2.5 parts acetylacetone and heating for a short time to 70° C., 14 parts of stearic acid are then dissolved therein, while stirring, at 80° C., and the mixture is diluted with 4000 parts of carbon tetrachloride, containing 40 parts of paraffin.

When the fabric has passed the impregnating bath, the liquid is squeezed off to an increase in weight of about 100 percent and finally dried at about 60° C. by means of hot air of a relative moisture content of about 30 percent. The fabric so treated shows excellent properties of water-repellency.

Example 54

A poplin fabric of regenerated cellulose is impregnated for 5 minutes in a standing bath with a stabilized solution of paraffin and the condensation product of aluminum ethylate and benzoic acid in carbon tetrachloride, which has been obtained as follows: To 1000 parts of a solution of aluminum ethylate in ethyl acetate (2.7 percent of aluminum), obtained by the process described in German Patent No. 386,688, 6 parts of acetoacetic ester are added dropwise, while stirring, and the mixture is stirred for ½ hour at about 40° C. To the solution of aluminum ethylate now stabilized against moisture the solution of 12 parts of benzoic acid in 100 parts of alcohol is added, while stirring. The clear mixture is boiled for ½ hour under reflux and finally diluted with the solution of 40 parts of paraffin in 4000 parts of carbon tetrachloride.

After the impregnating process, the liquid is squeezed off from the fabric in a wringing machine to an increase in weight of about 100 percent, and the fabric is heated for ½ hour at about 120° C. in a warming cabinet. A very good water-repellent effect is thus obtained.

When proceeding in the same manner but using, instead of benzoic acid, 18 parts of lauric acid or 22 parts of stearic acid (molecular weight: 270, solidification point: 52° C.), the same result is obtained.

Example 55

Upper garments made of poplin of cotton are impregnated for 15 minutes at about 20° C., at a ratio of goods to liquor of about 1:20, in a scouring machine generally used for dry cleaning, with a solution of paraffin and the stabilized condensation product of acetic aluminum ethylate and stearic acid in perchloroethylene, which has been obtained as follows: 510 parts of a solution of commercial aluminum ethylate in ethyl acetate (2.7 percent of aluminum), obtained by the process described in German Patent No. 386,688, are stabilized against moisture at about 30° C. and while stirring, with 22 parts of acetoacetic ester, and after 15 minutes 30 parts of glacial acetic acid are added drop by drop at about 20° C.–30° C. In the stabilized solution so obtained 85 parts of stearic acid are dissolved, while stirring, at about 40° C. and most of the ethyl acetate is then distilled off under reduced pressure. In the residue 200 parts of paraffin and 50 parts of gatsch are dissolved, while stirring, at about 60° C., and the rest of the ethyl acetate is then distilled off under a pressure of at about 100 millimeters of mercury and at a temperature of 70° C. of the mixture. The hot residue is diluted with 400 parts of perchloroethylene and solidifies, on cooling, to a lard-like consistency. In order to prepare the impregnating bath, 1 part of the lard-like substance is dissolved in 20 parts of perchloroethylene. After the impregnating process, the fabric is centrifuged in the same machine to an increase in weight of about 50 percent, dried with hot air of about 70° C. and, if necessary, ironed. By this treatment excellent properties of water-repellency of the material are obtained. By the same method upper garment of wool or polyamide fibers can likewise be rendered water-repellent.

Example 56

A fabric of polyamide, polyacrylnitrile or polyester fibers is impregnated with a solution containing per liter of carbon tetrachloride 10 grams of a pasty agent imparting properties of water-repellency, the liquid is then squeezed off in the padding machine, the fabric is dried and ironed at about 120° C. By this hydrophobic finish the percent water absorbed in the rain room test is reduced as follows: with a perlon fabric from 42 to 3, a nylon fabric from 38 to 3.5, a fabric of polyacrylnitrile from 49 to 3, and a fabric of polyester fibers on the basis of terephthalic acid and ethylene glycol from 18 to 1. An excellent water-repellent effect is likewise obtained.

The pasty agent imparting water-repellent properties has been obtained as follows: 110 kilograms of a solution of commercial aluminum ethylate, containing halogen, in ethyl acetate (2.2 percent aluminum) prepared by the process described in German Patent No. 386,688 are reacted at 70° C. with 11 kilograms of stearic acid, and the ethylacetate is distilled off. To the molten mass of the condensation product 60 kilograms of paraffin are added and the whole is intimately mixed. 100 kilograms of perchloroethylene are then added and the mixture is cooled, while stirring; a thickly pasty product capable of being poured is obtained.

When proceeding in the same manner but using, instead of stearic acid, the corresponding amount of oleic acid, an excellent water-repellent effect is likewise obtained.

We claim:

1. The process of imparting hydrophobic properties to fibrous materials which comprises treating the material with an indifferent organic solution containing, in a solvent selected from the group consisting of low-boiling hydrocarbons and low-boiling chlorinated hydrocarbons, a mixture of 1 mol of an aluminum alcoholate and from 0.2 to 2.5 mol of a monobasic organic acid capable of forming salts with aluminum and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

2. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an α-aluminum alcoholate with from 0.2 to 2.5 mol of a monobasic organic acid capable of forming salts with aluminum and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

3. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate containing less than 1 equivalent of organic radicals bound to aluminum by means of oxygen for 1 equivalent of aluminum with from 0.2 to 2.5 mol of a monobasic organic acid capable of forming salts with aluminum and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

4. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of a halogen containing aluminum alcoholate obtained by action of aliphatic alcohols upon aluminum chloride with from 0.2 to 2.5 mol of a monobasic organic acid capable of forming salts with aluminum and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

5. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate stabilized by reaction with volatile complex forming organic compounds with from 0.2 to 2.5 mol of a monobasic organic acid capable of forming salts with aluminum and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

6. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate with from 0.2 to 2.5 mol of an aliphatic carboxylic acid and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

7. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate with from 0.2 to 2.5 mol of a high molecular aliphatic carboxylic acid and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

8. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate with from 0.2 to 2.5 mol of a monobasic organic acid capable of forming salts with aluminum and further containing high molecular paraffin hydrocarbons, and drying said material at a temperature sufficient to produce a water repellent finish containing residual alkoxy groups.

9. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate with from 0.3 to 0.8 mol of a monobasic organic acid capable of forming salts with aluminum and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

10. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction in the presence of volatile complex forming organic compounds of 1 mol of an aluminum alcoholate with from 0.2 to 2.5 mol of a monobasic organic acid capable of forming salts with aluminum and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

11. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate with from 0.2 to 2.5 mol of a monobasic organic acid capable of forming salts with aluminum while subsequently introducing volatile complex forming organic compounds and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

12. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate with from 0.2 to 2.5 mol of a monobasic organic acid capable of forming salts with aluminum and further containing a compound selected from the group consisting of high molecular paraffin hydrocarbons, natural waxes, synthetic waxes and high molecular polychlorinated hydrocarbons, heating the impregnated material at an elevated temperature, and drying said material at a temperature sufficient to produce a water repellent finish containing residual alkoxy groups.

13. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate with from 0.2 to 2.5 mol of a monobasic organic acid capable of forming salts with aluminum and further containing a compound selected from the group consisting of high molecular paraffin hydrocarbons, natural waxes, synthetic waxes and high molecular polychlorinated hydrocarbons, heating the impregnated material at an elevated temperature in the presence of moisture, and drying said material at a temperature sufficient to produce a water repellent finish containing residual alkoxy groups.

14. The process of imparting hydrophobic properties to fibrous materials which comprises treating the material with an indifferent organic solution containing, in a solvent selected from the group consisting of low-boiling hydrocarbons and low-boiling chlorinated hydrocarbons, product obtained by reaction of 1 mol of an aluminum alcoholate with from 0.2 to 2.5 mol of a monobasic organic acid and further containing a compound selected from the group consisting of high molecular paraffin hydrocarbons, natural waxes, synthetic waxes and high molecular polychlorinated hydrocarbons, and drying said material at a temperature sufficient to produce a water repellent finish containing residual alkoxy groups.

15. A hydrophobic fibrous material prepared in accordance with the process of claim 14.

References Cited in the file of this patent
UNITED STATES PATENTS

| | | |
|---|---|---|
| 1,536,254 | White | May 5, 1925 |
| 2,225,197 | Stagner | Dec. 17, 1940 |
| 2,345,142 | Muller | Mar. 28, 1944 |
| 2,466,672 | Habib et al. | Apr. 12, 1949 |
| 2,469,041 | Jones | May 3, 1949 |
| 2,599,553 | Hotten | June 10, 1952 |
| 2,695,250 | Shields et al. | Nov. 23, 1954 |

FOREIGN PATENTS

| | | |
|---|---|---|
| 657,815 | Great Britain | Sept. 26, 1951 |